Feb. 13, 1962 W. R. HUTCHINS 3,021,521
FEED-THROUGH NULLING SYSTEMS
Filed Nov. 30, 1955 2 Sheets-Sheet 1
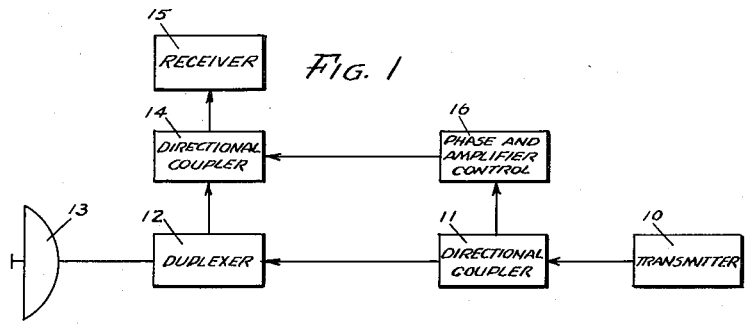
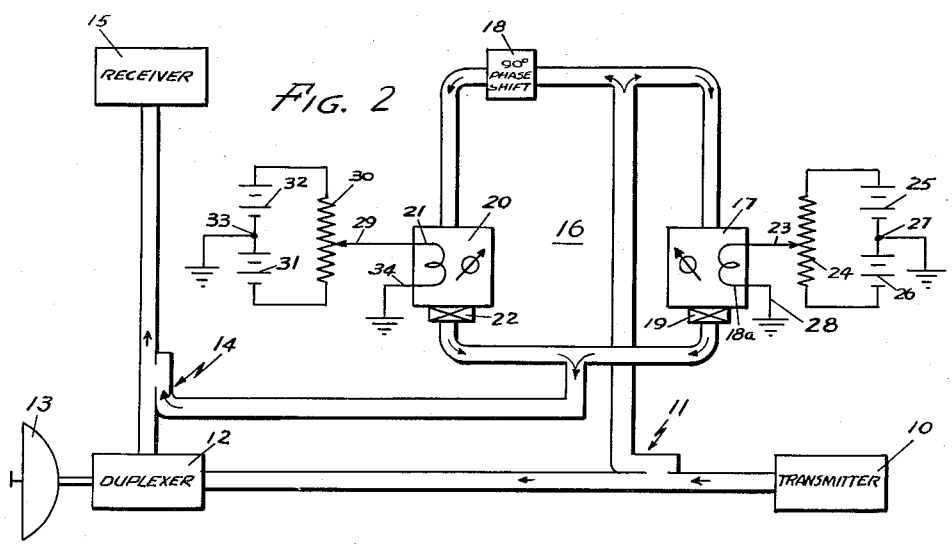
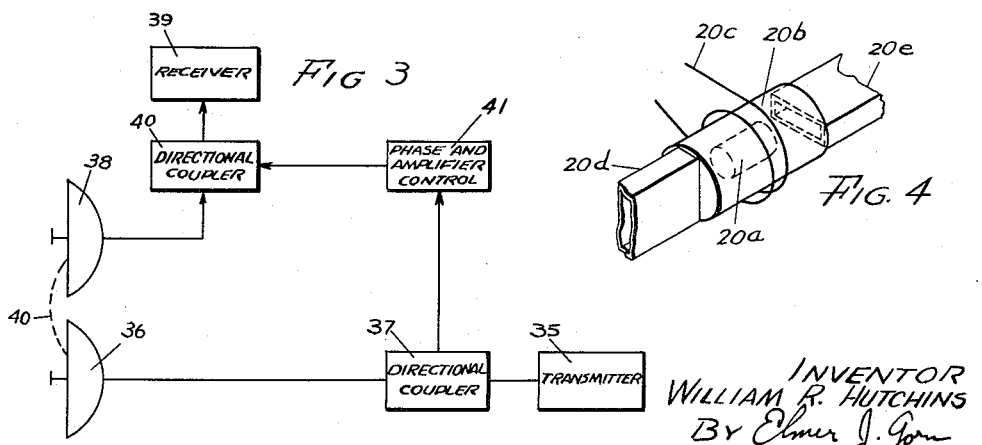
INVENTOR
WILLIAM R. HUTCHINS
BY Elmer J. Gorn
ATTORNEY

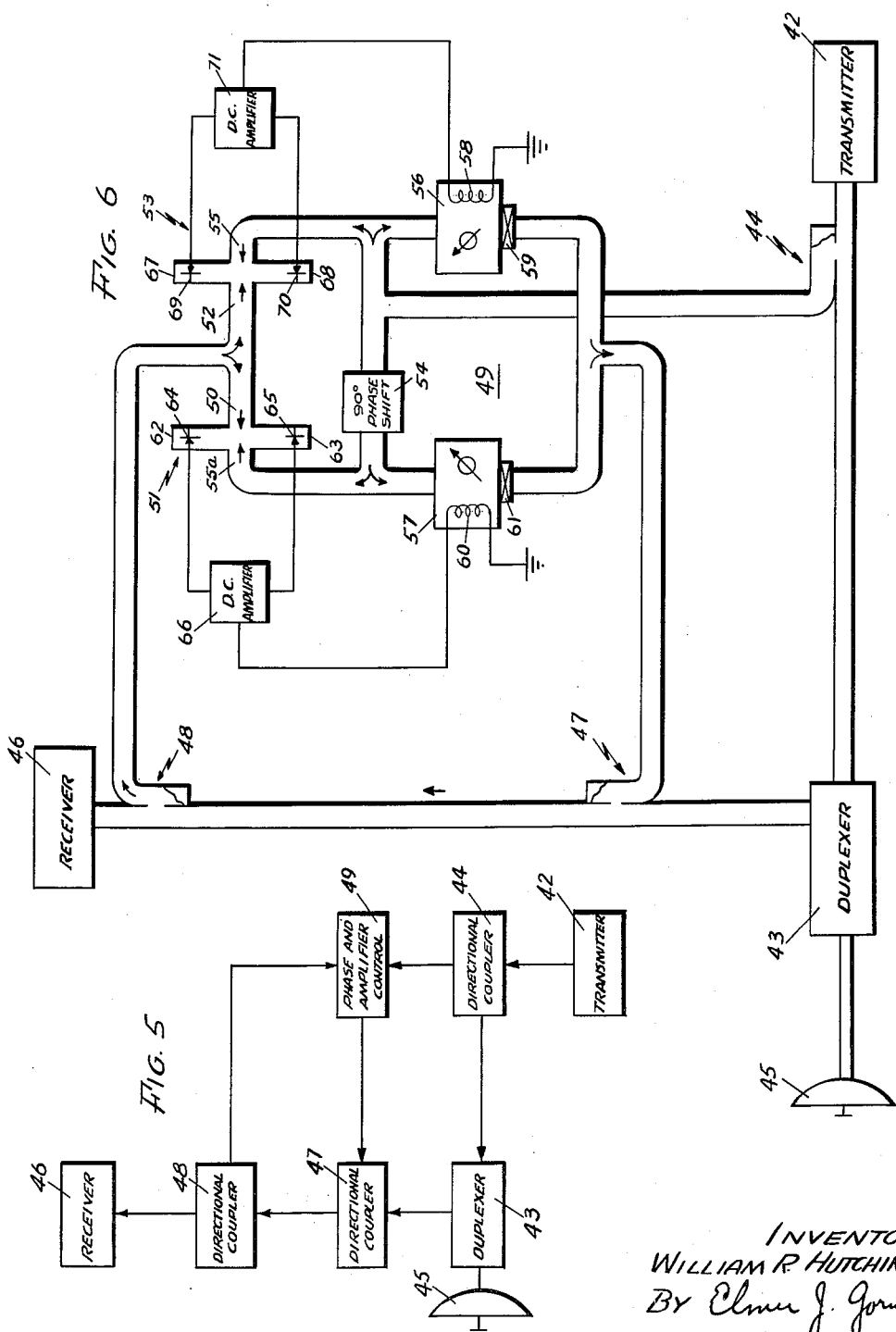

United States Patent Office 3,021,521
Patented Feb. 13, 1962

3,021,521
FEED-THROUGH NULLING SYSTEMS
William R. Hutchins, Lexington, Mass., assignor to
Raytheon Company, a corporation of Delaware
Filed Nov. 30, 1955, Ser. No. 549,916
9 Claims. (Cl. 343—5)

This invention relates to a feed-through nulling system and more specifically to a system in which the output signal which is the source of the feed-through signal is directly operated upon and used to cancel said feed-through signal.

In a communication system utilizing a transmitter and a receiver a portion of the transmitted energy is invariably directed and fed to the receiver. This energy regardless of how it is coupled to the receiver will henceforth be referred to as the feed-through signal.

In continuous wave (CW) radars, the output signal from the transmitter is a continuous wave of energy which is changed in frequency by reflections caused by the presence of a moving target. This change in frequency is called the Doppler effect and is detected by continuously comparing the incoming reflected signal with the outgoing transmitted signal and then feeding the frequency change or Doppler signal to a receiver. Since it is necessary for the received frequency to be continuously compared with the transmitted frequency there must of necessity be close coupling between the transmitter and the receiver. Unfortunately this close coupling results in a portion of the transmitted energy, which we have defined as the feed-through signal, being fed directly to the receiving means which results in saturation of the receiver and in degradation of the system sensitivity. Attempts have been made to eliminate this feed-through signal by the design of more efficient duplexing equipment in systems wherein a single antenna is used for both receiver and transmitter. Separate antennas for both transmitter and receiver have also been resorted to as a means of eliminating the feed-through signal. All these systems heretofore designed for eliminating the feed-through signal at the source have been unsuccessful due to the basic requirement that the transmitted signal must be continuously compared with the received signal. Since all attempts to eliminate feed-through at the source have been unsuccessful, CW radar systems have had to be limited in available power output as a means for proportionately reducing the feed-through signal.

In this invention a correction signal is produced directly from the output signal. This correction signal is made equal in magnitude and opposite in phase to the feed-through signal and is then algebraically combined with the feed-through signal in such a manner that the feed-through signal fed to the receiving means will be canceled. This system can also be made into a continuous nulling system by sampling the feed-through signal fed to the receiving means and making the correction signal, which is produced from the output signal, continuously responsive to the sampled feed-through signal, and then combining said correction signal with said feed-through signal for canceling said feed-through signal.

In the continuous feed-through nulling system a first directional coupler is used for sampling the feed-through signal fed to the receiving means and the output of said directional coupler is fed to a first and second balanced detector. A second directional coupler is used for sampling and feeding a portion of the output signal to a first, gyrator or rotator, a ninety degree phase shifting network and said first balanced detector. The output of said phase shifting network is fed to a second gyrator and said second balanced detector. The outputs of said first and second gyrators are responsive to the outputs of said first and second balanced detectors in such a manner that the output signals from said first and second gyrators are equal in magnitude and opposite in phase with said feed-through signal. A third directional coupler combines the output of said first and second gyrators with said feed-through signal thereby canceling said feed-through signal.

Further objects and advantages of this invention will be apparent as the description progresses, reference being made to the accompanying drawings wherein:

FIG. 1 is a block diagram of a feed-through nulling system using a single antenna for receiving and transmitting and where the feed-through signal is constant;

FIG. 2 is a schematic diagram of the system illustrated in FIG. 1;

FIG. 3 is a block diagram of a feed-through nulling system using a separate antenna for transmitting and receiving and where the feed-through signal is constant;

FIG. 4 illustrates a gyrator type modulator or rotator;

FIG. 5 is a block diagram of a closed loop feed-through nulling system using a single antenna for receiving and transmitting and where the feed-through signal is a varying quantity; and FIG. 6 is a schematic diagram of the system illustrated in FIG. 5.

Referring now to FIGS. 1 and 2 there is shown a transmitter 10 feeding a directional coupler 11 which feeds duplexer 12. Duplexer 12 feeds antenna 13 and also directional coupler 14 which in turn feeds receiver 15. Duplexer 12 can be of any conventional type that will direct the transmitted energy from transmitter 10 directly to antenna 13 and also direct the received energy from antenna 13 to receiver 15. The objectional feed-through signal will be inevitably coupled from transmitter 10 to receiver 15 through duplexer 12. In order to cancel this feed-through energy a portion of the transmitted signal is sampled by means of directional coupler 11 and fed to a phase and amplifier control 16 where the sampled transmitted energy is directly operated upon thereby producing a correction signal equal in magnitude and opposite in phase to the feed-through signal. This correction signal is fed to directional coupler 14 where it is combined with the feed-through energy fed from duplexer 12 to receiver 15 thereby canceling said feed-through signal. The relationship between directional couplers 11 and 14 produces a 180 degree phase difference between the feed-through signal at 14 and the sampled transmitted signal at 11.

Referring now to FIG. 2 there is shown more specifically the details of the phase and amplifier control 16. Directional coupler 11 samples and feeds a portion of the transmitted energy from transmitter 10 to both gyrator 17 and a ninety degree phase shifting network 18. Gyrator 17 is of a conventional type having a control winding 18a and an output having a cross-polarized output as indicated by reference 19, thereby preventing any signal from passing through said gyrator 17 unless a control signal is fed to winding 18a. The output of phase shifting network 18 is fed through a second gyrator 20 which is similar to gyrator 17 in that no output signal will pass through gyrator 20 unless a control voltage is applied to winding 21 due to the cross-polarized ouput indicated by 22. Gyrators 17 and 20 may be of the well-known gyrator type as illustrated in FIGURE 4 wherein a ferrite core 20a is placed within a waveguide 20b and a control winding 20c responsive to a D.C. voltage is placed around said waveguide containing the ferrite core. Due to the cross-polarization of the input waveguide 20d and the output waveguide 20e there can be no output signal unless a control voltage is fed to control windings 20c. In order to obtain a voltage for control winding 18a, one end 23 of coil 18a is connected to a variable resistor 24 which in turn is connected in parallel across batteries 25 and 26 which are connected in series. The interconnection point 27 of batteries 25 and 26 and the opposite end 28 of coil 18a are grounded. This particular arrangement enables control winding 18a to be set at a voltage of predetermined amplitude and sign. In a similar manner control winding 21 of gyrator 20 is connected at point 29 to resistor 30 which in turn is connected in parallel with batteries 31 and 32 which are connected in series. The interconnection 33 of batteries 31 and 32 and the opposite end 34 of coil 21 are grounded. In this manner the voltage applied to control winding 21 can be varied in amplitude and sign. It should be understood that any suitable means of supplying a voltage to windings 18a and 21 can be used. The output signals from gyrators 17 and 20 are fed to directional coupler 14 where they are combined with the feed-through signal fed to receiver 15, thereby canceling said feed-through signal. The placement of directional coupler 11 and the path for both the inphase signal fed to gyrator 17 and the phase quadrature signal fed to gyrator 20 is such that a 180 degree phase difference exists between the directional coupler 11 and directional coupler 14 for both the inphase and the phase quadrature signals. Therefore, by controlling the voltage fed to control winding 18a of gyrator 17 it is possible to control the amplitude of the inphase signal passing through gyrator 17. In a similar manner, by controlling the voltage fed to control winding 21 of gyrator 20, it is possible to control the amplitude of the signal passing through gyrator 20, which signal is in phase quadrature to the signal fed to modulator 17. Depending therefore on the amplitude and phase of the feed-through signal being fed to receiver 15, it is necessary to pick a voltage from resistors 24 and 30 such that the outputs of gyrators 17 and 20 will pass signals which when fed to directional coupler 14 will combine with the feed-through signal fed to receiver 15, thereby canceling said feed-through signal.

Referring now to FIG. 3, there is shown a system similar in operation to that shown in FIG. 1 with the exception that a separate antenna is used for receiving and transmitting energy. Transmitter 35 feeds the transmitting antenna 36 through a directional coupler 37. A receiving antenna 38 feeds the received information to receiver 39 through directional coupler 40. In systems of this type the feed-through signal is usually detected by receiving antenna 38 directly from the transmitted signal radiated by antenna 36. This feed-through signal is illustrated by dotted line 40. The cancellation of the feed-through signal is similar in operation to that described for FIGS. 1 and 2 in that a portion of the transmitted energy is sampled by directional coupler 37 and fed to a phase and amplifier control 41 which in turn produces a correction signal equal in magnitude and opposite in phase to the feed-through signal. This correction signal is fed to directional coupler 40 where it is mixed with the feed-through signal in such a manner that said feed-through signal is canceled. The systems illustrated and described for FIGS. 1, 2 and 3 are particularly adaptable for high power transmitters where the feed-through signal is substantially constant.

Referring now to FIGS. 5 and 6, there is shown a CW radar system utilizing the principles of this invention for continuously nulling the feed-through signal by means of a closed loop feedback system. The basic system comprises a transmitter 42 feeding duplexer 43 through directional coupler 44. Duplexer 43 is connected to a common antenna 45 and also receiver 46 through directional couplers 47 and 48. A portion of the transmitted signal is fed from directional coupler 44 to a phase and amplifier control 49. Directional coupler 48 feeds a sampling of the feed-through signal to the phase and amplifier control 49 where the sampled output signal fed by directional coupler 44 is operated upon in such a manner that a correction signal is produced directly from said output signal. For continuous feed-through nulling of direction coupler 48 continuously samples a portion of the feed-through signal fed to receiver 46. The correctional signal fed to directional coupler 47 is therefore made continuously responsive to the signal from directional coupler 48 thereby insuring that a proper signal equal in magnitude and opposite in phase to the feed-through signal is being produced by the phase and amplifier control 49 and fed to directional coupler 47. The relationship between directional coupler 44 and 47 is such that a 180 degree phase difference between the feed-through signal 47 and the sampled transmitted signal 44 is produced.

Referring now to FIG. 6, there is shown in more detail the specific system illustrated in FIG. 5. Directional coupler 48 samples and feeds the feed-through signal to leg 50 of balanced detector 51 and also to leg 52 of balanced detector 53. Directional coupler 44 samples and feeds a portion of the output signal from transmitter 42 to a ninety degree phase shifting network 54, leg 55 of belanced detector 53 and to gyrator 56. The output of phase shifting network 54 is fed to leg 55a of balanced detector 51 and gyrator 57. Gyrator 56 has a control winding 58 and a ninety degree polarization shift in the output as indicated by reference 59. Gyrator 57 is similar to gyrator 56 and contains a control winding 60 and a ninety degree polarization shift as indicated by reference 61. Both polarization shifts 59 and 61 are rotated ninety degrees in relationship to the phase of the incoming signal, thereby preventing any signal from passing through either gyrator until a control signal is fed to the windings of said respective gyrator. The opposite legs 62 and 63 of balanced detector 51 are shorted and the outputs detected by crystals 64 and 65 are fed to a D.C. amplifier 66. In a similar manner the opposite legs 67 and 68 of balanced detector 53 are shorted and the outputs detected by crystals 69 and 70 are fed to a D.C. amplifier 71. The output of D.C. amplifier 66 is connected to control winding 60 of gyrator 57 and in a similar manner the output of D.C. amplifier 71 is connected to control winding 58 of gyrator 56. It will be observed therefore that the balanced detector 51 will produce an output signal responsive to both the feed-through signal and a portion of the output signal that has had a ninety degree phase shift. Balanced detector 53, on the other hand, will produce an output signal that is responsive both to the feed-through signal and an inphase component of the output signal. The outputs of gyrators 56 and 57 are operated upon by the outputs of D.C. amplifiers 66 and 71 through the action of control windings 60 and 58 in such a manner that the output signals produced are equal in magnitude and opposite in phase to the feed-through signal. In order to prevent the feed-back nulling system from canceling the Doppler signal, D.C. amplifiers 66 and 71 have a limited frequency response that does not cover the range of the expected Doppler signal, the Doppler signal having been previously defined as the difference between the transmitted and received signals. The output signals of the gyrators 56 and 57 are combined and called the correction signal which is then fed to directional coupler 47 where it is mixed with the feed-through signal in such a manner that said feed-through signal appearing at directional coupler 48 is canceled.

This completes the description of the embodiments of the invention illustrated herein. However, many modifications and advantages thereof will be apparent to persons skilled in the art without departing from the spirit and scope of this invention. Accordingly, it is desired that this invention not be limited to the particular details of the embodiments enclosed herein, except as defined by the appended claims.

What is claimed is:

1. In combination, a transmitter for producing an output signal cooperating with a receiver, means for feeding a feed-through signal derived from said output signal, means for continuously sampling a portion of said output signal and producing a first signal in phase with said output signal and a second signal in phase quadrature with said output signal, means for feeding said first signal through a first gyrator and said second signal through a second gyrator to provide a correction signal from the outputs of said first and second gyrators, which correction signal is equal in magnitude and opposite in phase to said feed-through signal, and means for combining said correction signal with said feed-through signal in order to cancel said feed-through signal fed to said receiver.

2. In combination, a transmitter for producing an output signal cooperating with a receiver, means for feeding a feed-through signal derived from said output signal, means for continuously sampling a portion of said output signal and producing a first signal in phase with said output signal and a second signal in phase quadrature with said output signal, means for feeding said first signal through a first gyrator and said second signal through a second gyrator for controlling the phase output of said first and second gyrator thereby producing a correction signal, which is equal in magnitude and opposite in phase to said feed-through signal, and means for combining said feed-through signal with the outputs of said first and second gyrators in order to cancel said feed-through signal fed to said receiver.

3. In combination, a transmitter for producing an output signal cooperating with a receiver, means for feeding a feed-through signal derived from said output signal, means for sampling a portion of said output signal and producing a first signal in phase with said output signal and a second signal in phase quadrature with said output signal, means for feeding said first signal through a first gyrator and said second signal through a second gyrator, means for controlling said first and second gyrators to control the phase and amplitude of a correction signal, which is equal in magnitude and opposite in phase to said feed-through signal, and means for combining said feed-through signal with the outputs of said first and second gyrators in order to cancel said feed-through signal fed to said receiver.

4. In combination, a transmitter for producing an output signal cooperating with a receiver, means for feeding a feed-through signal derived from said output signal, means responsive to said feed-through signal and said output signal for producing a correction signal directly from said output signal and at substantially the same frequency as said output signal, which correction signal is equal in magnitude and opposite in phase to said feed-through signal, and means for combining said correction signal with said feed-through signal in order to cancel said feed-through signal fed to said receiver.

5. In combination, a transmitter for producing a continuous wave output signal cooperating with a receiver, means for feeding a feed-through signal derived from said output signal, means responsive to said feed-through signal and said output signal for producing a correction signal at substantially the same frequency as said output signal directly from said output signal, which correction signal is equal in magnitude and opposite in phase to said feed-through signal, and means for combining said correction signal with said feed-through signal in order to cancel said feed-through signal fed to said receiver.

6. In combination, a transmitter for producing an output signal cooperating with a receiver, means for feeding a feed-through signal derived from said output signal, means for sampling and feeding said feed-through signal to a first and second balanced detector, means for sampling a portion of said output signal and producing a first signal in phase with said output signal and a second signal in phase quadrature with said output signal, means for feeding said first signal to said first balanced detector and said second signal to said second balanced detector, means responsive to the outputs of said first and second balanced detectors for producing a correction signal directly from said output signal, which correction signal is equal in magnitude and opposite in phase to said feed-through signal, and means for combining said correction signal with said feed-through signal in order to cancel said feed-through signal fed to said receiver, 7. In combination, a transmitter for producing an output signal cooperating with a receiver, means for feeding a feed-through signal derived from said output signal, means for sampling and feeding said feed-through signal to a first and second balanced detector, means for sampling a portion of said output signal and producing a first signal in phase with said output signal and a second signal in phase quadrature with said ouput signal, means for feeding said first signal to said first balanced detector and said second signal to said second balanced detector, means for feeding said first signal through a first gyrator and said second signal through a second gyrator, said first and second gyrators responsive to the outputs of said first and second balanced detectors for producing a correction signal from the outputs of said first and second gyrators, which correction signal is equal in magnitude and opposite in phase to said feed-through signal, and means for combining said correction signal with said feed-through signal in order to cancel said feed-through signal fed to said receiver.

8. In combination, a transmitter for producing an output signal cooperating with a receiver, means for feeding a feed-through signal derived from said output signal, means for sampling and feeding said feed-through signal to a first and second balanced detector, means for sampling a portion of said output signal and producing a first signal in phase with said output signal and a second signal in phase quadrature with said output signal, means for feeding said first signal to said first balanced detector and said second signal to said second balanced detector, said first balanced detector producing a first voltage in response to said feed-through signal and said first signal, said second balanced detector producing a voltage in response to said feed-through signal and said second signal, means for feeding said first signal through a first gyrator and said second signal through a second gyrator, said first gyrator responsive to said first voltage output of said first detector and said second gyrator responsive to the voltage output of said second detector for producing a signal from said first and second gyrators that is equal in magnitude and opposite in phase to said feed-through signal, and means for combining the output signals from said first and second gyrators with said feed-through signal in order to cancel said feed-through signal fed to said receiver.

9. In combination, a transmitter for producing a continuous wave output signal cooperating with a receiver, a first duplexer for sampling said feed-through signal fed to said receiving means, the output of said first duplexer fed to a first and second balanced detector, a second duplexer for sampling and feeding a portion of said output signal through a first gyrator, a ninety degree phase shifting network and a first balanced detector, the output of said phase shifting network fed through a second gyrator and a second balanced detector, said first and second gyrators responsive to the outputs of said first and second balanced detectors for producing a correction signal from the outputs of said first and second gyrators, which correction signal is equal in magnitude and opposite in phase to said feed-through signal, and a third duplexer for combining said correction signal with said feed-through signal in order to cancel said feed-through signal fed to said receiver.

References Cited in the file of this patent

UNITED STATES PATENTS

| | | |
|---|---|---|
| 2,253,958 | Luck | Aug. 26, 1941 |
| 2,551,348 | Sunstein | May 1, 1951 |
| 2,583,573 | Jaynes | Jan. 29, 1952 |
| 2,745,069 | Hewitt | May 8, 1956 |
| 2,748,353 | Hogan | May 29, 1956 |
| 2,760,057 | Johannesen | Aug. 21, 1956 |
| 2,866,192 | Johnson et al. | Dec. 23, 1958 |